(12) United States Patent
Endo et al.

(10) Patent No.: US 8,002,482 B2
(45) Date of Patent: Aug. 23, 2011

(54) TRANSPARENT SCREEN, PROJECTION DISPLAY DEVICE, AND METHOD OF RECEIVING CONTROL SIGNAL LIGHT

(75) Inventors: Takao Endo, Tokyo (JP); Yuzo Nakano, Tokyo (JP); Hayato Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 159 days.

(21) Appl. No.: 12/419,422

(22) Filed: Apr. 7, 2009

(65) Prior Publication Data
US 2010/0134883 A1 Jun. 3, 2010

(30) Foreign Application Priority Data
Nov. 28, 2008 (JP) .................. 2008-303685

(51) Int. Cl.
  *G03B 21/10* (2006.01)
  *G02B 27/44* (2006.01)
  *G02B 3/08* (2006.01)
(52) U.S. Cl. ............ 396/457; 353/38; 353/75; 353/121; 359/456; 359/742; 359/743
(58) Field of Classification Search .................. 359/457, 359/443, 460; 353/52, 74, 70, 94, 122
See application file for complete search history.

(56) References Cited

U.S. PATENT DOCUMENTS

| 4,941,036 | A  | * | 7/1990 | Itoh ............................... 348/778 |
| 7,242,536 | B2 | * | 7/2007 | Suzuki et al. .................. 359/742 |
| 2007/0121208 | A1 | * | 5/2007 | Ogawa et al. ................. 359/457 |
| 2007/0285773 | A1 | * | 12/2007 | Ogawa .......................... 359/457 |
| 2008/0180643 | A1 | * | 7/2008 | Endo et al. ....................... 353/38 |

FOREIGN PATENT DOCUMENTS
JP 63-2477 1/1988
JP 63-002477 * 1/1988

OTHER PUBLICATIONS
Google Search.*
U.S. Appl. No. 12/609,923, filed Oct. 30, 2009, Endo, et al.
U.S. Appl. No. 12/359,652, filed Jan. 26, 2009, Endo, et al.
U.S. Appl. No. 14/747,420, filed Jun. 10, 2010, Endo, et al.

* cited by examiner

*Primary Examiner* — Clayton E LaBalle
*Assistant Examiner* — Kevin Butler
(74) *Attorney, Agent, or Firm* — Oblon, Spivak, McClelland, Maier & Neustadt, L.L.P.

(57) ABSTRACT

A transparent screen is constructed in such a way that a plurality of Fresnel prisms 12d each of which is smaller than a plurality of Fresnel prisms 12a and has a shape approximately similar to that of each of the plurality of Fresnel prisms 12a are arranged in a sawtooth shape on a non-light incidence surface portion of a Fresnel lens 12 on a light incidence side to which any image light PB applied from a projector 1 is not applied directly because blocked by a Fresnel prism 12a placed frontwardly.

9 Claims, 7 Drawing Sheets

TRANSPARENT SCREEN, PROJECTION DISPLAY DEVICE, AND METHOD OF RECEIVING CONTROL SIGNAL LIGHT

BACKGROUND OF THE INVENTION

1. Field of the Invention

The present invention relates to a transparent screen which receives image light projected onto a rear side thereof as viewed from a side thereof which faces a viewer so as to display an image, a projection display device which projects image light onto the rear side of the screen so as to display an image, and a method of condensing control signal light applied to the transparent screen from a remote controller onto a photo detector to receive the control signal light.

2. Description of Related Art

A projection display device is an image display device which consists of a Fresnel lens screen, a diffusion sheet (a diffusion layer), and so on. Unlike a CRT (Cathode Ray Tube) and a PDP (Plasma Display Panel), this projection display device is of non-light-emitting type. The projection display device is provided with, as a projector, an illuminating optical system for guiding light applied from a light source in a predetermined direction, a light valve for applying the light guided by the illuminating optical system, and for adjusting the amount of the light according to an image signal so as to form an image, and a projection optical system for expanding and projecting the image formed by the light valve onto a screen.

Projection display devices include a display device of rear projection type which projects image light onto a rear side of the screen thereof as viewed from a viewer and a display device of front projection type which projects image light onto a front side of the screen thereof as viewed from a viewer. A transparent screen for use in a display device of back projection type, among these projection display devices, includes a Fresnel lens screen for bending image light expanded and projected by a projector toward the viewer, and an image display element for forming an image of the image light from the Fresnel lens screen and for providing an angle of divergence for the image light so as to expand the image light.

There is a remote controller as a means for operating a projection display device by remote control. The remote controller uses a light signal having a wavelength which falls within a wavelength band of infrared rays including visible light rays. Because the Fresnel lens screen of a projection display device has a function of bending image light expanded and projected from a light source toward the direction of the viewer, the Fresnel lens screen also has a function of condensing control signal light from a remote controller applied thereto from the direction of the viewer onto a projector inversely. In other words, by using the Fresnel lens as a condensing lens, the control signal light applied from the remote controller can be condensed onto a photo detector efficiently.

A method of receiving such control signal light applied from a remote controller is disclosed by, for example, the following patent reference 1.

[Patent reference 1] JP,63-2477,A (FIG. 2)

Because conventional projection display devices are constructed as mentioned above, if a Fresnel lens screen functions as a condenser lens which condenses incident light onto the optical axis of an optical system, the Fresnel lens screen can condense control signal light applied from a remote controller onto a photo detector efficiently. However, a problem with a case in which a Fresnel lens screen, which is an eccentric optical system, for use in thin-type projection display devices which have seen in recent years is used is that most of the Fresnel lens cannot guide control signal light applied from a remote controller to a photo detector, and therefore the control signal light applied from the remote controller cannot be condensed onto the photo detector efficiently.

SUMMARY OF THE INVENTION

The present invention is made in order to solve the above-mentioned problem, and it is therefore an object of the present invention to provide a transparent screen, a projection display device, and a control signal light receiving method which can guide control signal light applied from a remote controller to a photo detector efficiently even when using a Fresnel lens screen which is an eccentric optical system.

In accordance with the present invention, there is provided a transparent screen in which, on a non-light incidence surface portion of a Fresnel optical element to which any light ray applied from a light emitting body is not applied directly because blocked by a Fresnel prism placed frontwardly, a plurality of Fresnel prisms each of which is smaller than the above-mentioned Fresnel prism and has a shape approximately similar to that of the above-mentioned Fresnel prism are arranged in a sawtooth shape.

In accordance with the present invention, the transparent screen is constructed in such a way that, on the non-light incidence surface portion of the Fresnel optical element to which any light ray applied from a light emitting body is not applied directly because blocked by a Fresnel prism placed frontwardly, the plurality of Fresnel prisms each of which is smaller than the above-mentioned Fresnel prism and has a shape approximately similar to that of the above-mentioned Fresnel prism are arranged in a sawtooth shape. Therefore, the present embodiment offers an advantage of being able to guide control signal light applied from a remote controller toward a photo detector efficiently even when using the Fresnel lens screen which is an eccentric optical system.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
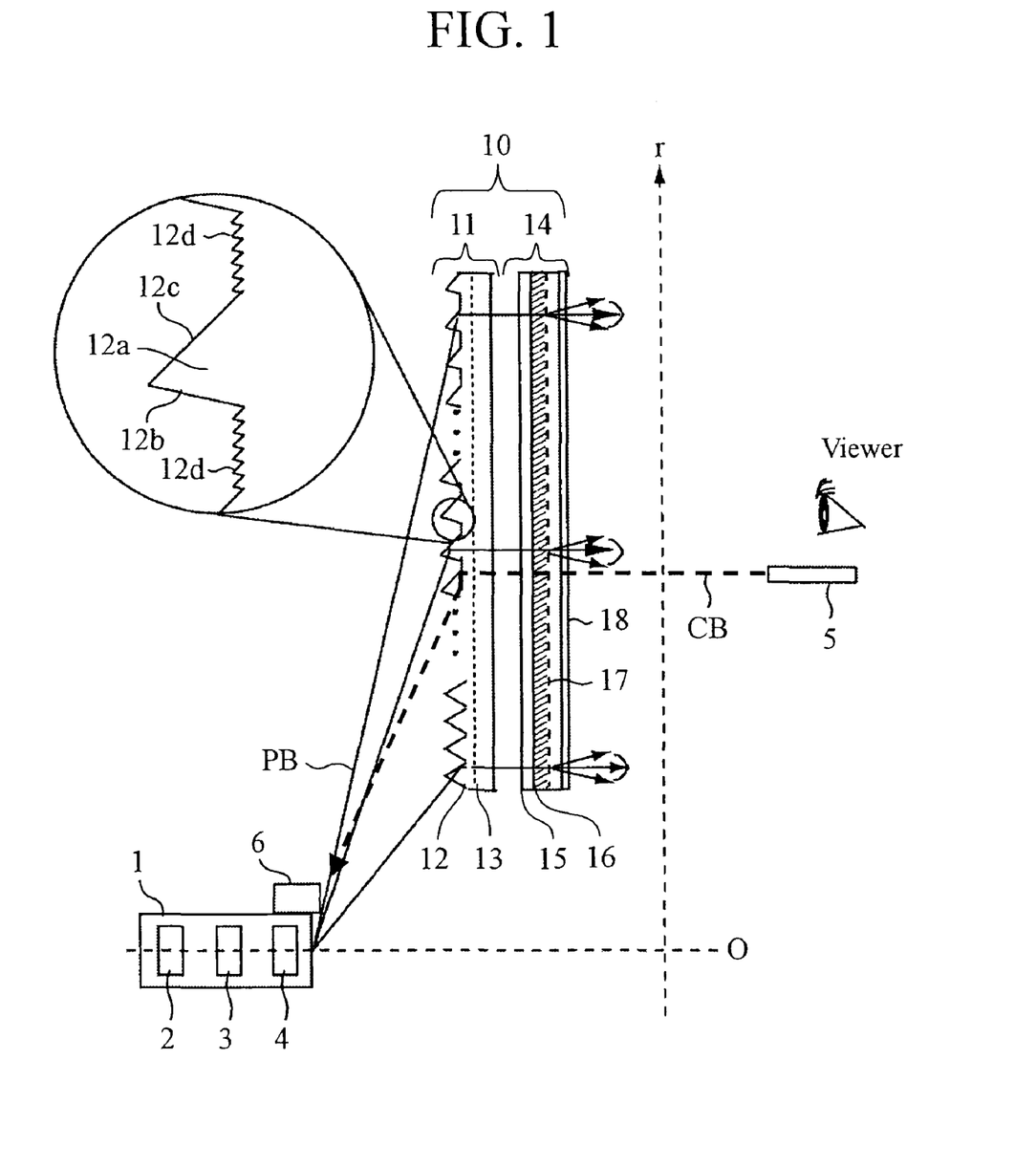
FIG. 1 is a configuration diagram showing a projection display device in accordance with Embodiment 1 of the present invention.
Figure 2:
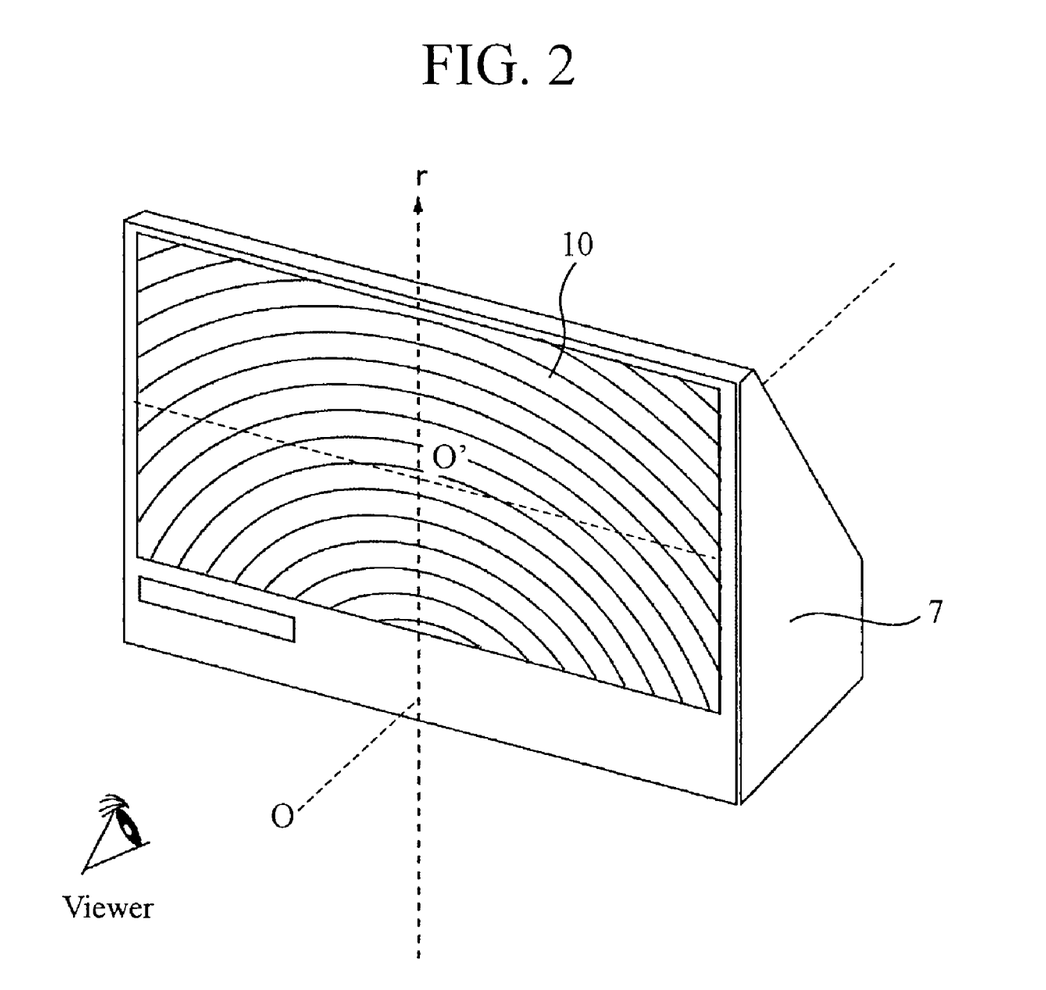
FIG. 2 is a perspective view showing the projection display device in accordance with Embodiment 1 of the present invention.
Figure 3:
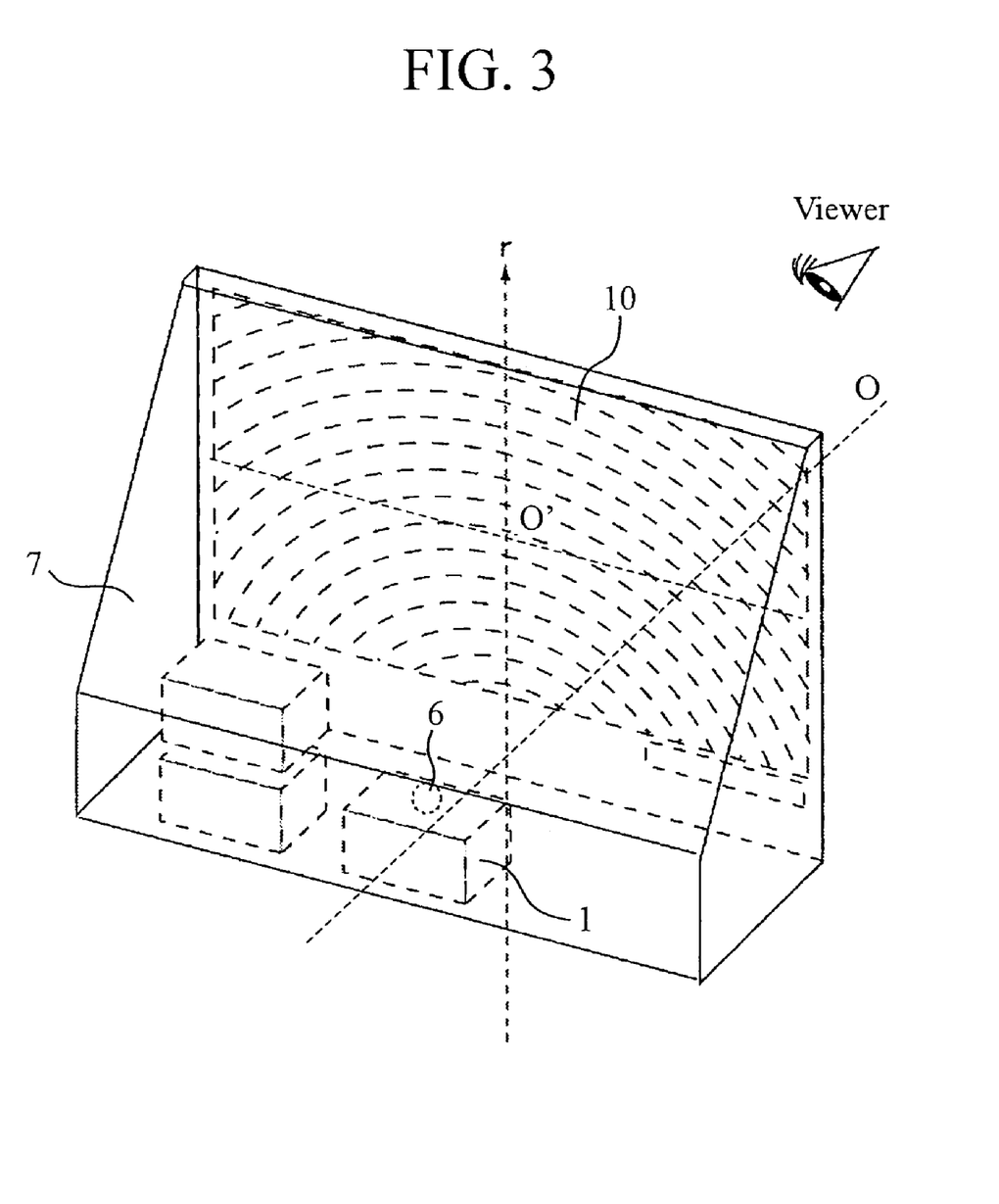
FIG. 3 is a perspective view showing the interior of the projection display device in accordance with Embodiment 1 of the present invention.

FIG. 1 is a configuration diagram showing a projection display device in accordance with Embodiment 1 of the present invention. FIG. 2 is a perspective view showing the projection display device in accordance with Embodiment 1 of the present invention, and FIG. 3 is a perspective view showing the interior of the projection display device in accordance with Embodiment 1 of the present invention. As shown in FIG. 1, a projector 1 is a light emitting body which is installed in a housing 7 of the projection display device, and which emits a light ray which is image light PB. The projector 1 is comprised of an illuminating optical system 2, a light valve 3, and a projection optical system 4. The illuminating optical system 2 guides light applied thereto from a light source (not shown) in a predetermined direction. The light valve 3 applies the light guided by the illuminating optical system 2 to the projection optical system 4, and carries out a process of adjusting the amount of the light according to an image signal to form an image. The projection optical system 4 expands and projects the image formed by the light valve 3 onto a transparent screen 10.

A remote controller 5 is remote operation equipment with which a user performs an operation of, for example, switching among images, and emits control signal light CB showing the operation. A photo detector 6 is equipment installed in the vicinity of the projector 1 for receiving the control signal light CB applied thereto from the remote controller 5.

The transparent screen 10 is comprised of a Fresnel lens screen 11 and an image display element 14, and receives the image light PB applied thereto from the projector 1 and then emits the image light PB toward the viewer while receiving the control signal light CB applied thereto from the remote controller 5 and then emitting the control signal light CB toward the photo detector 6. The Fresnel lens screen 11 is comprised of a light entering surface side Fresnel lens 12 and a base 13, and has a function of bending the image light PB applied thereto from the projector 1 toward the direction of the viewer.

The light entering surface side Fresnel lens 12 is a Fresnel optical element formed in the Fresnel lens screen 11 on a side of the light source (a light entering surface side) which is opposite to the viewer's side, in which a plurality of Fresnel prisms 12a each of which has a refractive surface 12b for refracting the image light PB applied thereto from the projector 1 and a reflecting surface 12c for reflecting the image light PB refracted by the refractive surface 12b are arranged in a sawtooth shape. A plurality of Fresnel prisms 12d which are smaller than the Fresnel prisms 12a and have a shape approximately similar to that of the Fresnel prisms 12a are arranged in a sawtooth shape on each non-light incidence surface portion upon which the image light PB emitted from the projector 1 is not incident directly because the image light is blocked by a Fresnel prism placed frontwardly.

The image display element 14 is comprised of a lens element 15, a light diffusing member 16, a base 17, and a surface processing member 18, and has a function of forming an image of the image light PB whose optical path has been bent by the Fresnel lens screen 11, and also providing the image light PB with an angle of divergence so as to expand the image light PB. The lens element 15 has a function of providing the image light PB with an angle of divergence. The light diffusing member 16 has a function of forming an image of the image light PB. The base 17 holds the lens element 15, the light diffusing member 16, etc., and is formed of a resin such as PMMA (Poly Methyl Meth Acrylate), MS (Methyl methacrylate Styrene), MBS (Methyl metacylate Butadiene Styrene), or PC (Polycarbonate).

The surface processing member 18 can be comprised of various types of layers which are formed on a surface side of the image display element 14 which is the nearest to the viewer. For example, the various types of layers can be an antireflection layer for reducing reflection of light in order to reduce the influence of ambient light, an anti glare layer for reducing visual glare, an antistatic layer for preventing adhesion of dust due to static electricity, and a hard coating layer for protecting the surface of the image display element 14. In this Embodiment 1, it is assumed that when the base 17 is formed, the light diffusing member 16 is incorporated into the base in the form of layers so that a pair of light diffusing layers are formed, though, in a case in which the base 17 is made of glass, the light diffusing member 16 in the form of a film can be bonded to the base with a bonding layer. In this Embodiment 1, although the light diffusing member 16 and the base 17 are arranged from the side of the light source to the side of the viewer in the order of the light diffusing member 16 and the base 17, they can be inversely arranged in the order of the base 17 and the light diffusing member 16. Furthermore, the base 17 can be integral with the light diffusing member 16.

In the example of FIG. 1, O shows the optical axis of the optical system, and the optical system is arranged in an eccentric form in such a way that the optical axis O is aligned outside the transparent screen 10 which serves as the screen. As shown in FIGS. 2 and 3, the concentric circular Fresnel lens whose center is on the optical axis O is placed eccentrically in such a way that the optical axis O is shifted from the center O' of the screen.

Next, the operation of the projection display device will be explained. The Fresnel lens screen 11 of the transparent screen 10 is a field lens which deflects the image light PB applied thereto from the projector 1 toward the direction of the viewer, and is designed so as to have the functions of a collimate lens for collimating the image light PB in such a way that the image light becomes substantially-collimated light. Considering that light is inputted to and outputted from the Fresnel lens screen 11 after traveling along a path inverse to the above-mentioned path, the light entering surface side Fresnel lens 12 of the Fresnel lens screen 11 has the functions of a condenser lens for condensing light applied thereto from the direction of the viewer toward the direction of the projection optical system 4.

Considering the outward appearance of a television set in which this projection display device is mounted, the most of the television set is occupied by the transparent screen 10 which constructs the screen, an operation which is performed on the television by using the remote controller 5, which is remote operation equipment, is equivalent to an operation which is performed on the transparent screen 10. In a case in which the photo detector 6 which receives the control signal light CB applied thereto from the remote controller 5 is installed in the vicinity of the projector 1, the control signal light CB applied from the remote controller 5 is efficiently condensed by the Fresnel lens screen 11 and is guided toward the direction of the projection optical system 4. However, taking into consideration that the control signal light CB applied from the remote controller 5 is incident upon the screen at an angle with the normal to the screen, and passes through the light diffusing member 16, the lens element 15, etc., it can be assumed that the light does not necessarily reach the projection optical system 4 and is received by the photo detector 6 located before the projection optical system 4.

Figure 4:
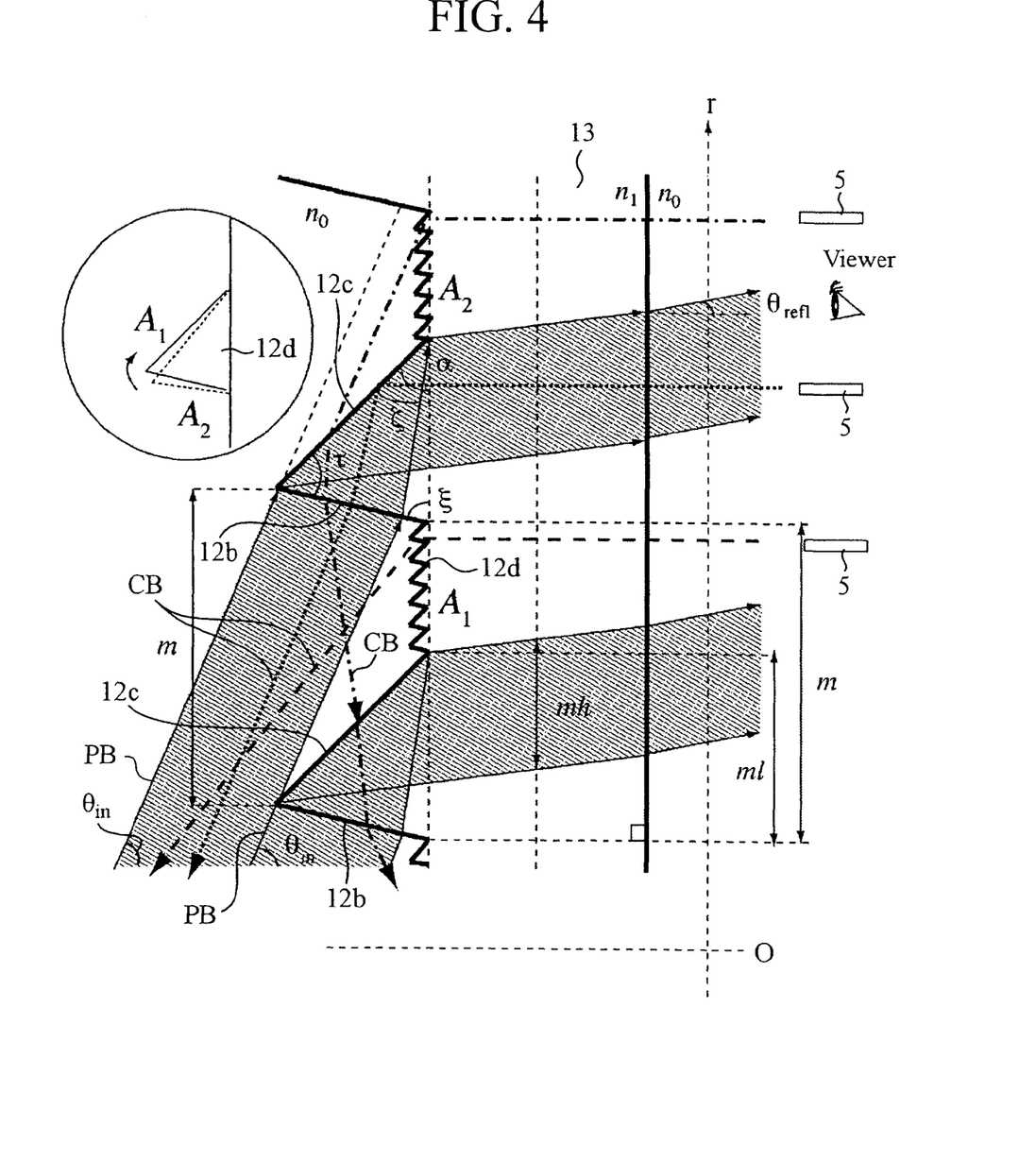
FIG. 4 is an explanatory drawing showing a deflection of the optical path of image light PB and a deflection of the optical path of control signal light CB which are caused by a transparent screen 10 in accordance with Embodiment 1 of the present invention.
Figure 5:
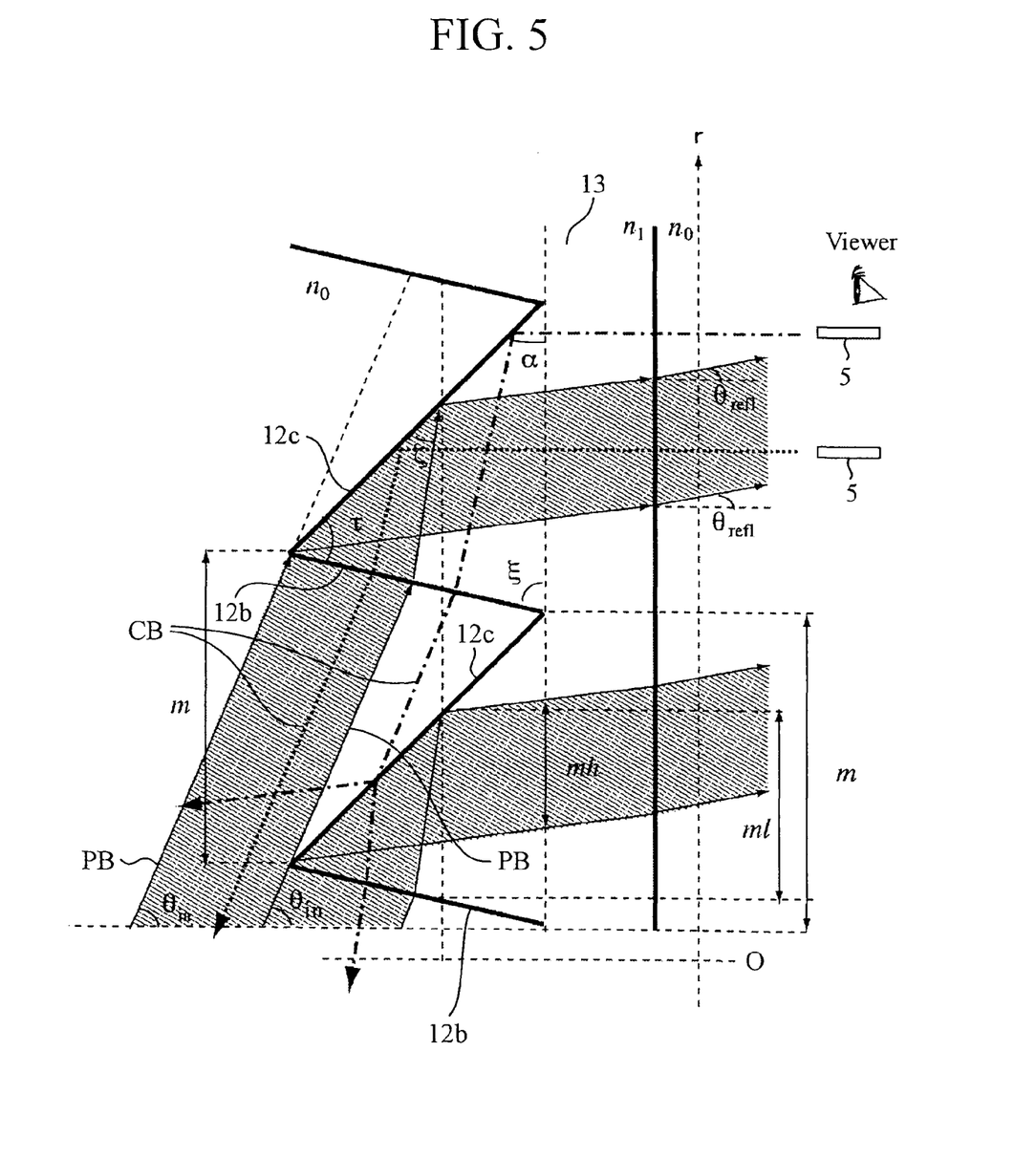
FIG. 5 is an explanatory drawing showing deflections of the optical paths in a case in which no Fresnel prism 12*d* is placed on a non-light incidence surface of a light entering surface side Fresnel lens 12 in the transparent screen 10 of FIG. 3.

It can be seen by examining the optical path in detail that only a control signal light ray, among the control signal light rays CB applied from the remote controller 5, which travels along an optical path inverse to the optical path of the image light PB applied from the projector 1 is condensed toward the projection optical system 4, and the other control signal light rays which travel along the other optical paths are not condensed correctly. Hereafter, this point will be explained in detail. FIG. 4 is an explanatory drawing showing a deflection of the optical path of the image light PB and deflections of the optical path of the control signal light CB in the transparent screen 10 in accordance with Embodiment 1 of the present invention. FIG. 5 is an explanatory drawing showing a deflection of the optical path of the image light PB and deflections of the optical path of the control signal light CB in a case in which no Fresnel prisms 12d are arranged on each non-light incidence surface portion of the light entering surface side Fresnel lens 12 in the transparent screen 10 of FIG. 4.

The light entering surface side Fresnel lens 12 is constructed in such a way that the plurality of Fresnel prisms 12a each of which has a refractive surface 12b for refracting the image light PB applied thereto from the projector 1 and a reflecting surface 12c for reflecting the image light PB refracted by the refractive surface 12b toward the viewer are arranged in a sawtooth shape. The image light PB which is incident upon each Fresnel prism 12a at an angle $\theta_{in}$ is emitted at an angle $\theta_{refl}$ by the refractive surface 12b and the reflecting surface 12c of each Fresnel prism 12a. On the basis of geometry and the Snell's law, this relationship is shown by the following equation (1).

[Equation 1]

$$\theta_{refl}(\theta_{in}; \alpha, \tau) = \sin^{-1}\left(\frac{n_1}{n_0}\sin\left[\sin^{-1}\left(\frac{n_0}{n_1}\sin(\pi - \tau - \alpha - \theta_{in})\right)\right]\right) \quad (1)$$

where $\tau$ is the vertical angle of each Fresnel prism 12a, $\xi$ is the angle of the refractive surface 12b, and $\alpha$ is the angle (total reflection surface angle) of the reflecting surface 12c. Furthermore, $n_0$ is the refractive index of the atmosphere, and $n_1$ is the refractive index of each Fresnel prism 12a and the refractive index of the base 13. The angle $\zeta$ is shown by the following equation (2).

[Equation 2]

$$\zeta = \frac{\pi}{2} - \tau - \sin^{-1}\left[\frac{n_0}{n_1}\sin(\pi - \tau - \alpha - \theta_{in})\right] \quad (2)$$

By transforming the equation (1), the total reflection surface angle $\alpha$ can be shown by the following equation (3).

[Equation 3]

$$\alpha(\theta_{in}; \theta_{refl}, \tau) = \tan^{-1}\left[\frac{\sin(\theta_{in} + \tau) + \frac{n_1}{n_0}\sin\left(\tau - \sin^{-1}\left[\frac{n_0}{n_1}\sin\theta_{refl}\right]\right)}{-\cos(\theta_{in} + \tau) + \frac{n_1}{n_0}\cos\left(\tau - \sin^{-1}\left[\frac{n_0}{n_1}\sin\theta_{refl}\right]\right)}\right] \quad (3)$$

This equation (3) means that the total reflection surface angle $\alpha$ is a function of the incident angle $\theta_{in}$, the function type being determined by two degrees of freedom: the total reflection surface angle $\alpha$ and the vertical angle $\tau$ of each Fresnel prism 12a. That is, because the viewer is placed in substantially front of the transparent screen 10 and the angle at which the image light is emitted from the screen is determined as $\theta_{refl} \approx 0$, the total reflection surface angle $\alpha$ at the incident angle $\theta_{in}$ can be determined automatically when the vertical angle $\tau$ of each Fresnel prism 12a is determined. Because the angle $\xi$ of the refractive surface 12b can be determined, as shown in the following equation (4), from the sum of the triangular interior angles, the shapes (angles) of the surfaces which construct the light entering surface side Fresnel lens 12 are determined uniquely.

[Equation 4]

$$\xi = \pi - \tau - \alpha \quad (4)$$

Each diagonally shaded portion of FIG. 5 shows the optical path of the image light PB applied from the projector 1. Because the shape of the light entering surface side Fresnel lens 12 is determined in such a way as mentioned above, the image light PB applied from the projector 1 is bent toward the direction of the viewer. In contrast, the control signal light traveling along the optical path (each diagonally shaded portion) of the image light PB in the reverse direction (i.e., the control signal light shown by a dotted line), among the rays of control signal light CB applied from the remote controller 5, is bent toward the projector 1, while because the control signal light which does not travel along the optical path (each diagonally shaded portion) of the image light PB in the reverse direction (i.e., the control signal light shown by a dashed dotted line) propagates through a plurality of Fresnel prisms 12a and then becomes stray light, the control signal light is not condensed correctly.

The condensing efficiency of the control signal light CB at that time approximately becomes equal to the percentage of each diagonally shaded portion, as shown in FIG. 5, to the pitch m of the plurality of Fresnel prisms 12a. In the example of FIG. 5, because the size of each diagonally shaded portion is about one-third of the pitch m of the plurality of Fresnel prisms 12a, about one-third of the control signal light CB can be condensed efficiently, but about two-thirds of the control signal light CB is lost. The percentage h of each diagonally shaded portion to the pitch m of the plurality of Fresnel prisms 12a is shown by the following equation (5).

[Equation 5]

$$h = \frac{l\tan\xi}{\tan\alpha + \tan\xi}\left[1 - \frac{\frac{n_0}{n_1}\sin\theta_{refl}\tan\alpha}{\cos\left(\sin^{-1}\left[\frac{n_0}{n_1}\sin\theta_{refl}\right]\right)}\right] \quad (5)$$

In this Embodiment 1, in order to condense the control signal light CB applied from the remote controller 5 efficiently, a plurality of Fresnel prisms 12d are arranged on each non-light incidence surface portion of the light entering surface side Fresnel lens 12 in the transparent screen 10. More specifically, in the light entering surface side Fresnel lens 12, the refractive surface 12b and the reflecting surface 12c of each Fresnel prism 12a which serve as the optical path (each diagonally shaded portion) of the image light PB are remained, and a plurality of Fresnel prisms 12d which are a supplementary lens are arranged in each portion which does not serve as the optical path (each diagonally shaded portion) of the image light PB. The percentage l of the lens portion remained in the light entering surface side Fresnel lens 12 is calculated according to the following equation (6). It cannot be overemphasized that in actual, the percentage l can be set to a somewhat larger value by making the percentage have some margin (from 10% to 20%).

[Equation 6]

$$l = \frac{\tan\xi + \tan(\alpha - \zeta)}{\tan\alpha - \tan(\alpha - \zeta)} \frac{\tan\alpha + \tan\xi}{\tan\xi(1 + \tan\theta_{in}\tan\xi)} \quad (6)$$

Because the role of each set of plural Fresnel prisms 12d which is a supplementary lens is to guide the control signal light CB applied from the remote controller 5 toward a neighborhood of the projection optical system 4, each of the plural Fresnel prisms 12d has only to have a shape substantially similar to that of each Fresnel prism 12a which consists of the refractive surface 12b and the reflecting surface 12c in the easiest example. However, in the case in which each set of Fresnel prisms 12d which is a supplementary lens is formed in such a way as to have such a similar shape, the control signal light CB may propagate through a plurality of Fresnel prisms 12a and may become stray light (refer to a dashed dotted line of FIG. 4), like in the case of the light entering surface side Fresnel lens 12.

To solve this problem, each set of Fresnel prisms Fresnel prism 12d which is a supplementary lens is configured in such a way that the control signal light CB applied from the remote controller 5 is emitted out while being shifted slightly (in the example of FIG. 4, being shifted slightly upwardly) so that the control signal light CB is not blocked by each Fresnel prism 12a placed frontwardly (refer to the dashed line of FIG. 4). For example, in a case in which the lens shape of each of the plurality of Fresnel prisms 12d which are a supplementary lens is similar to that of each Fresnel prism 12a, what is necessary is just to slant each of the Fresnel prisms 12d which are a supplementary lens. Each Fresnel prism 12d arranged in a portion A2 shown in FIG. 4 has a shape similar to that of each Fresnel prism 12a, but its slanting surface is slightly slanted against a corresponding slanting surface of each Fresnel prism 12a. In FIG. 4, in order to explain the effect of the plurality of Fresnel prisms 12d, a portion A1 and the portion A2 are aligned in the light entering surface side Fresnel lens 12, as illustrated, but it cannot be overemphasized that it is not necessary to form the portions A1 and A2 in this way. Furthermore, each Fresnel prism 12a and each Fresnel prism 12d which is a supplementary lens are not necessarily similar to each other. The reason why each Fresnel prism 12a and each Fresnel prism 12d which is a supplementary lens are not necessarily similar to each other will be explained with reference to FIG. 6.

Figure 6:
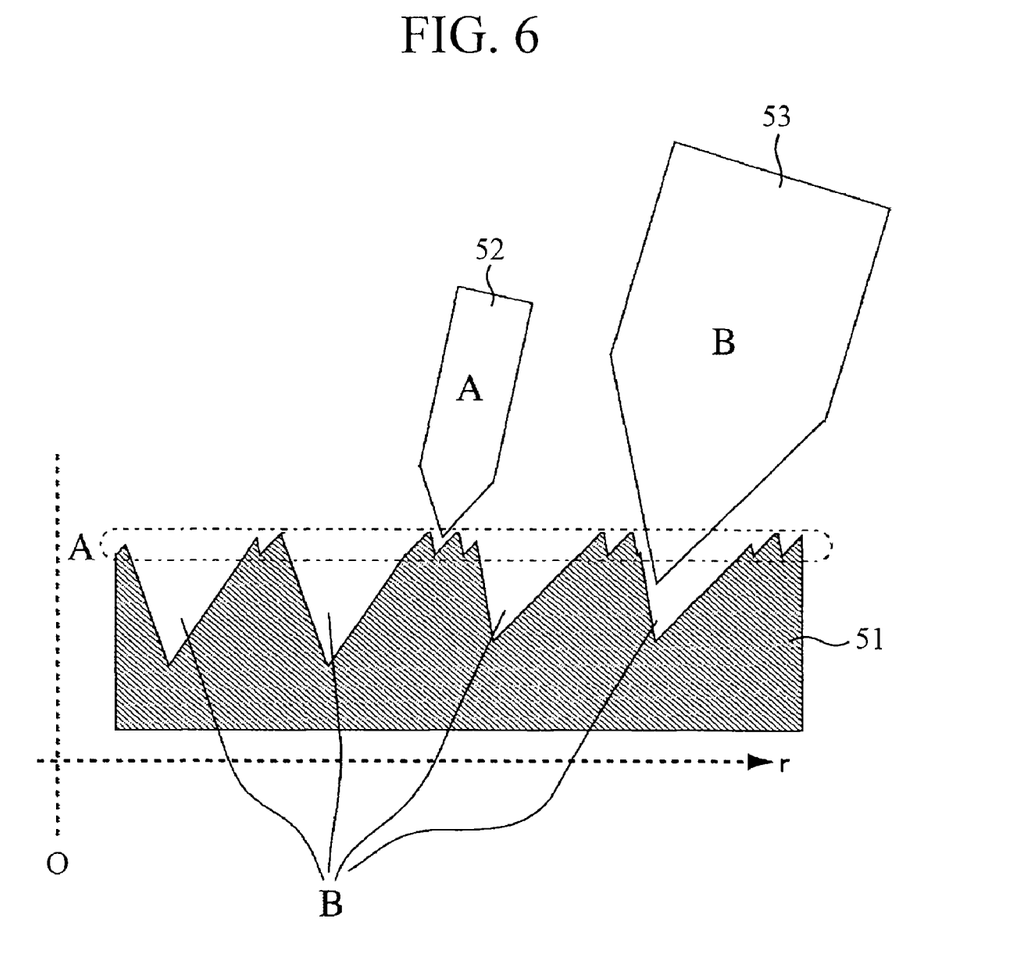
FIG. 6 is an explanatory drawing showing examples in which the light entering surface side Fresnel lens 12 are produced through cutting using different cutting bites 52 and 53.

FIG. 6 is an explanatory drawing showing an example in which the light entering surface side Fresnel lens 12 is produced through cutting using different cutting bites 52 and 53. Generally, the light entering surface side Fresnel lens 12 is produced by transferring the surface shape of a master mold 51 in which the shape of the Fresnel lens is carved onto a lens material. In the example of FIG. 6, each supplementary lens portion is cut by using the cutting bite 52 and each Fresnel lens portion is cut by using the cutting bite 53, and, as a result, each Fresnel prism 12d which is a supplementary lens and each Fresnel prism 12a can be formed in such a way that they do not necessarily have shapes similar to each other. Because by thus eliminating the constraints to make the shape of each Fresnel prism 12d which is a supplementary lens be similar to that of each Fresnel prism 12a, each set of a plurality of Fresnel prisms 12d which are a supplementary lens can be designed in such a way as to specialize in guiding the control signal light CB applied from the remote controller 5 toward a neighborhood of the projection optical system 4, the control signal light CB can be condensed efficiently.

Each set of a plurality of Fresnel prisms 12d which are a supplementary lens is formed so as to guide the control signal light CB applied from the remote controller 5 to the photo detector 6, and needs to be small compared with the pitch m of the plurality of Fresnel prisms 12a in such a way as not to block the image light PB. However, when the supplementary lens has a size which is of order of about several times to several ten times (a size of 5 microns) the wavelength of the control signal light, the image light is influenced not only by geometrical optics but by wave optics (for example, diffraction phenomena of light). Therefore, the pitch of the supplementary lens needs to be smaller than the pitch m of the plurality of the Fresnel prism 12a, and needs to be larger than the wavelength lambda of the control signal light.

By thus forming a plurality of Fresnel prisms 12d which are a supplementary lens in each non-light incidence surface portion to which the image light PB applied from the projector 1 is not applied directly because blocked by a Fresnel prism 12a placed frontwardly, the sensitivity of the reception of the control signal light CB applied from the remote controller 5 can be improved without having a bad influence on the image light PB. Because the Fresnel lens screen 11 condenses light traveling in a direction normal to the screen efficiently, the Fresnel lens screen 11 can selectively condense only the control signal light CB applied from the remote controller 5 which is operated by the viewer who can be expected to stay in a direction substantially normal to the screen without condensing noise, such as light emitted from a fluorescent lamp.

As can be seen from the above description, the projection display device in accordance with this Embodiment 1 is constructed in such a way that a plurality of Fresnel prisms 12d each of which is smaller than each Fresnel prism 12a and has a shape approximately similar to that of each Fresnel prism 12a are arranged in a sawtooth shape on each non-light incidence surface portion, to which the image light PB applied from the projector 1 is not applied directly, of the light entering surface side Fresnel lens 12 because the image light PB is blocked by a Fresnel prism 12a placed frontwardly. Therefore, the present embodiment offers an advantage of being able to guide the control signal light applied from the remote controller 5 toward the photo detector 6 efficiently even when using the Fresnel lens screen 11 which is an eccentric optical system.

Figure 7:
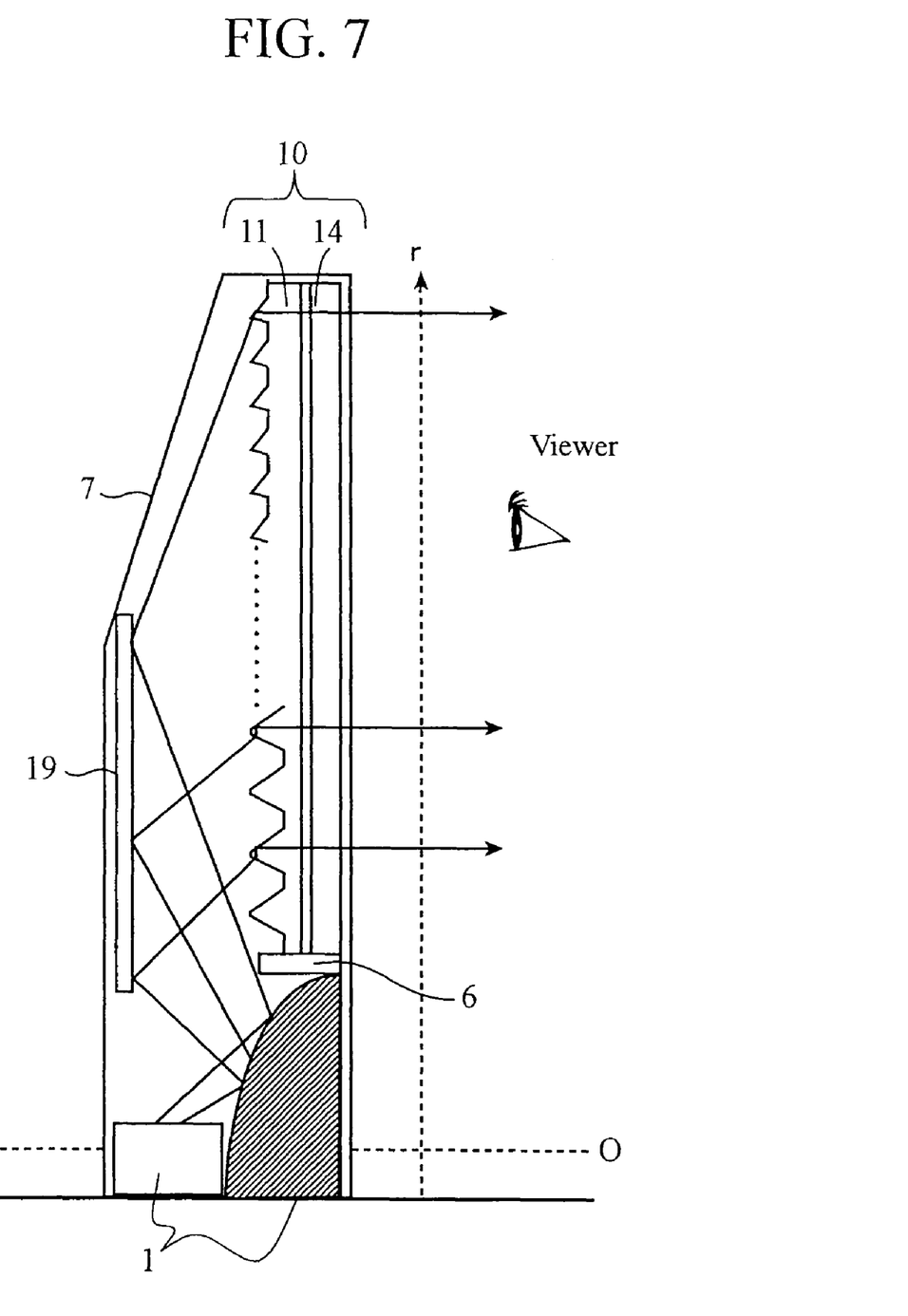
FIG. 7 is a configuration diagram showing another example of the projection display device in accordance with Embodiment 1 of the present invention.

In this Embodiment 1, the Fresnel lens screen 11 receives the image light PB which is applied directly thereto from the projector 1, as previously shown. As an alternative, as shown in FIG. 7, at least one or more reflecting mirrors 19 are placed between the projector 1 and the Fresnel lens screen 11 in such a way that the Fresnel lens screen 11 receives the image light PB reflected by the one or more reflecting mirrors 19. In addition, the projection display device can have, as its component, a holding mechanism, an air conditioner, a speaker, a television stand, an electrical circuit, a geometrical correction circuit, or a color correction circuit. Furthermore, the light emitting body which serves as the light source can be a lamp having a continuous spectrum, or a laser or LED (Light Emitting diode) having a discrete spectrum.

Many widely different embodiments of the present invention may be constructed without departing from the spirit and scope of the present invention. It should be understood that the present invention is not limited to the specific embodiments described in the specification, except as defined in the appended claims.

What is claimed is:

1. A transparent screen, comprising:
    a Fresnel optical element in which a first plurality of Fresnel prisms each including a refractive surface for refracting a light ray applied thereto from a light emitting body and a reflecting surface for reflecting the light ray refracted by said refractive surface are arranged in a sawtooth shape along a surface of the Fresnel optical element; a second plurality of Fresnel prisms each of which is smaller than said first plurality of Fresnel prisms and has a shape approximately similar to each of said first plurality of Fresnel prisms arranged in a sawtooth shape on a non-light incidence portion of the surface of said Fresnel optical element, a light ray applied from said light emitting body being blocked from being applied to the second plurality by a Fresnel prism of the first plurality,
    wherein the second plurality of Fresnel prisms arranged on the non-light incidence surface portion of the Fresnel optical element receives control signal light applied thereto from remote operation equipment, and emits said control signal light toward a photo detector.

2. The transparent screen according to claim 1, wherein the remote operation equipment is a remote controller.

3. A projection display device, comprising:
    a light emitting body that applies a light ray which is image light; and
    a transparent screen that receives the light ray applied thereto from said light emitting body, and emits said light ray in a predetermined direction,
    wherein said transparent screen includes:
        a Fresnel optical element in which a first plurality of Fresnel prisms each including a refractive surface for refracting a light ray applied thereto from a light emitting body and a reflecting surface for reflecting the light ray refracted by said refractive surface are arranged in a sawtooth shape; and
        a second plurality of Fresnel prisms each of which is smaller than said first plurality of Fresnel prisms and has a shape approximately similar to each of said first plurality of Fresnel prisms arranged in a sawtooth shape on a non-light incidence portion of the surface of said Fresnel optical element, a light ray applied from said light emitting body being blocked from being applied to the second plurality by a Fresnel prism of the first plurality,
    wherein the second plurality of Fresnel prisms placed on the non-light incidence surface portion of the Fresnel optical element receives control signal light applied thereto from remote operation equipment, and emits said control signal light toward a photo detector.

4. The projection display device according to claim 3, wherein the remote operation equipment is a remote controller.

5. The projection display device according to claim 3, wherein the light emitting body is aligned outside of the transparent screen.

6. The projection display device according to claim 3, wherein the photo detector is aligned outside of the transparent screen.

7. The projection display device according to claim 3, wherein an optical axis of the light emitting body is aligned outside of the transparent screen.

8. A method of receiving control signal light which is applied from remote operation equipment and then emitting the light toward a light receiver through a transparent screen including a Fresnel optical element in which a first plurality of Fresnel prisms each having a refractive surface for refracting a light ray applied thereto from a light emitting body and a reflecting surface for reflecting the light ray refracted by said refractive surface are arranged along a surface of the Fresnel optical element in a sawtooth shape, wherein said method includes the step of:
    applying the control signal light from said remote operation equipment to said transparent screen and then emitting the control signal light from said transparent screen toward the light receiver by arranging a second plurality of Fresnel prisms each of which is smaller than said first plurality of Fresnel prisms and has a shape approximately similar to each of said first plurality of Fresnel prisms in a sawtooth shape on a non-light incidence portion of the surface of said Fresnel optical element, a light ray applied from said light emitting body being blocked from being applied to the second plurality by a Fresnel prism of the first plurality.

9. The method according to claim 8, wherein the remote operation equipment is a remote controller.

* * * * *